(12) United States Patent
Cheng

(10) Patent No.: US 9,042,909 B2
(45) Date of Patent: May 26, 2015

(54) LOCATION METHOD AND LOCATION SYSTEM FOR ACQUIRING TERMINAL LOCATION

(75) Inventor: Yichen Cheng, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 250 days.

(21) Appl. No.: 13/639,240

(22) PCT Filed: Feb. 25, 2011

(86) PCT No.: PCT/CN2011/071333
§ 371 (c)(1),
(2), (4) Date: Oct. 4, 2012

(87) PCT Pub. No.: WO2011/160465
PCT Pub. Date: Dec. 29, 2011

(65) Prior Publication Data
US 2013/0023288 A1    Jan. 24, 2013

(30) Foreign Application Priority Data
Jun. 23, 2010   (CN) .......................... 2010 1 0211191

(51) Int. Cl.
| | | |
|---|---|---|
| H04W 24/00 | (2009.01) | |
| H04W 8/02 | (2009.01) | |
| H04W 4/02 | (2009.01) | |
| H04W 64/00 | (2009.01) | |
| H04W 4/20 | (2009.01) | |

(52) U.S. Cl.
CPC ............... *H04W 8/02* (2013.01); *H04W 64/00* (2013.01); *H04W 4/02* (2013.01); *H04W 4/20* (2013.01)

(58) Field of Classification Search
CPC .............................. H04W 64/00; H04W 4/02

USPC .............. 455/456.1–457, 445, 418–419, 466, 455/560
See application file for complete search history.

(56) References Cited

U.S. PATENT DOCUMENTS

2007/0167167 A1* 7/2007 Jiang ............................. 455/453
2010/0261483 A1* 10/2010 Farmer ....................... 455/456.1

FOREIGN PATENT DOCUMENTS

| CN | 1859624 | 11/2006 |
|---|---|---|
| CN | 101478741 | 7/2009 |
| CN | 101867907 | 10/2010 |

OTHER PUBLICATIONS

International Search Report for PCT/CN2011/071333, English translation attached to original, Both completed by the Chinese Patent Office on Apr. 15, 2011, All together 8 Pages.

* cited by examiner

*Primary Examiner* — Marcos Torres
(74) *Attorney, Agent, or Firm* — Brooks Kushman P.C.

(57) ABSTRACT

A location method and system are provided for obtaining a location of a terminal. The location method comprises, when a gateway mobile location center is unable to obtain an address of a mobile switching center (MSC) to which the terminal belongs from a home location register (HLR) in a core network by sending location selecting routing signaling, after sending short message type information to trigger the home location register to update the location of the terminal and obtaining the address of the MSC to which the terminal belongs, the gateway mobile location center obtaining location parameters of the terminal by sending location request signaling, and calculating location information of the terminal.

8 Claims, 2 Drawing Sheets

LOCATION METHOD AND LOCATION SYSTEM FOR ACQUIRING TERMINAL LOCATION

CROSS-REFERENCE TO RELATED APPLICATION

This application is the U.S. national phase of PCT Appln. No. PCT/CN2011/071333 filed Feb. 25, 2011 which claims priority to Chinese Application No. 201010211191.8 filed Jun. 23, 2010, the disclosures of which are incorporated in their entirety by reference herein.

TECHNICAL FIELD

The present invention relates to a Global System for Mobile Communications (GSM for short), and more particularly, to a location method and location system for obtaining a location of a terminal.

BACKGROUND OF THE RELATED ART

Locating a terminal has important significance in emergent events or events involving the national security. An existing general method is shown in FIG. 1, in which a Gateway Mobile Location Center (GMLC for short) sends a location selecting routing message to a Home Location Register (HLR for short) to obtain an address of a mobile switching center to which a terminal belongs, then sends a location request message to a mobile switching center (MSC for short) to obtain location parameters of the terminal, and calculates location information of the terminal. However, since some network elements in communication systems are applicable to earlier protocol versions or implement single function, and don't support location selecting routing signaling, the expense of modifying such communication network elements are huge; in addition, sometimes the location information of the terminal cannot be obtained for reasons on network.

SUMMARY OF THE INVENTION

An object of the present invention is to provide a location method and location system for obtaining a location of a terminal so as to improve the performance of a location function of the terminal.

In order to solve the aforementioned technical problem, the present invention provides a location method for obtaining a location of a terminal comprising: when a gateway mobile location center is unable to obtain an address of a mobile switching center to which the terminal belongs from a home location register in a core network by sending location selecting routing signaling, after sending short message type information to trigger the home location register to update the location of the terminal and obtaining the address of the mobile switching center to which the terminal belongs, the gateway mobile location center obtaining location parameters of the terminal by sending location request signaling to the mobile switching center to which the terminal belongs, and calculating location information of the terminal.

Preferably, the gateway mobile location center being unable to obtain the address of the mobile switching center to which the terminal belongs from the home location register in the core network by sending the location selecting routing signaling means that after sending the location selecting routing signaling, the gateway mobile location center learns that the home location register does not support a location selecting routing function from error cause information returned by the home location register.

The step of sending the short message type information to trigger the home location register to update the location of the terminal and obtaining the address of the mobile switching center to which the terminal belongs comprises: the gateway mobile location center sending a short message selecting routing message to the home location register, and after receiving the short message selecting routing message, the home location register updating the location of the terminal and returning a short message selecting routing reply message carrying the address of the mobile switching center to which the terminal belongs.

Preferably, the gateway mobile location center being unable to obtain the address of the mobile switching center to which the terminal belongs from the home location register in the core network by sending the location selecting routing signaling means that:

after sending the location selecting routing signaling, the gateway mobile location center learns that the home location register does not support the current mobile application part protocol version from the error cause information returned by the home location register.

The step of sending the short message type information to trigger the home location register to update the location of the terminal and obtaining the address of the mobile switching center to which the terminal belongs comprises:

the gateway mobile location center sending the home location register a short message selecting routing message, the mobile application part protocol version of which is lower than the current mobile application part protocol version, and after receiving the short message selecting routing message, the home location register determining that the mobile application part protocol version of the short message selecting routing message is supported by the home location register, updating the location of the terminal and returning a short message selecting routing reply message carrying the address of the mobile switching center to which the terminal belongs.

Preferably, mobile application part protocols in terms of levels of versions from low to high include: mobile application part phase1 protocol, mobile application part Phase2 protocol, and mobile application part phase2+ protocol.

Preferably, the method further comprises:

when receiving a location request reply message not carrying the location parameters of the terminal after sending the location request signaling, the gateway mobile location center sending a short message termination call request to the mobile switching center to which the terminal belongs, and after receiving the short message termination call request, the mobile switching center to which the terminal belongs updating the location of the terminal and returning a termination call response message carrying the location parameters of the terminal.

In order to solve the aforementioned technical problem, the present invention also provides a location system for obtaining a location of a terminal comprising a gateway mobile location center, a home location register and a mobile switching center; wherein the gateway mobile location center is configured to, when being unable to obtain an address of the mobile switching center to which the terminal belongs from the home location register in a core network by sending location selecting routing signaling, after sending short message type information to the home location register and obtaining the address of the mobile switching center to which the terminal belongs from the home location register, send location request signaling to the mobile switching center to which the terminal belongs to calculate location information of the terminal based on location parameters of the terminal, which are obtained from the mobile switching center to which the terminal belongs.

The home location register is configured to update the location of the terminal after receiving the short message type information sent by the gateway mobile location center, and notify the gateway mobile location center of the updated address of the mobile switching center to which the terminal belongs.

Preferably, the gateway mobile location center is configure to, when learning that the home location register does not support a location selecting routing function from error cause information returned by the home location register after sending the location selecting routing signaling, send a short message selecting routing message to the home location register, and obtain the address of the mobile switching center to which the terminal belongs from a short message selecting routing reply message returned by the home location register.

The home location register is configured to, after receiving the short message selecting routing message sent by the gateway mobile location center, update the location of the terminal, and send the updated address of the mobile switching center to which the terminal belongs through the short message selecting routing reply message to the gateway mobile location center.

Preferably, the gateway mobile location center is configured to, when learning that the home location register does not support the current mobile application part protocol version from the error cause information returned by the home location register after sending the location selecting routing signaling, send a short message selecting routing message, the mobile application part protocol version of which is lower than the current mobile application part protocol version, and obtain the address of the mobile switching center to which the terminal belongs from a short message selecting routing reply message returned by the home location register.

The home location register is configured to, after receiving the short message selecting routing message sent by the gateway mobile location center, when determining the mobile application part protocol version of the received short message selecting routing message is supported by the home location register, update the location of the terminal, and send the upgraded address of the mobile switching center to which the terminal belongs to the gateway mobile location center through the short message selecting routing reply message.

Preferably, mobile application part protocols in terms of levels of versions from low to high include: mobile application part phase1 protocol, mobile application part Phase2 protocol, and mobile application part phase2+ protocol.

Preferably, the gateway mobile location center is further configured to, when receiving a location request reply message not carrying location parameters of the terminal after sending the location request signaling sent by the mobile switching center to which the terminal belongs, send a short message termination call request to the mobile switching center to which the terminal belongs.

The mobile switching center is configured to, as the mobile switching center to which the terminal belongs, update the location of the terminal after receiving the short message termination call request and return a termination call response message carrying the location parameters of the terminal.

In typical scenarios where the HLR does not support the location selecting routing function, the HLR does not support the current MAP protocol version and the MSC does not update the location of the user terminal, the present invention ensures smooth implementation of the location function of the terminal without any special network modification, thereby resulting in greatly decreased cost and flexible application.

PREFERRED EMBODIMENTS OF THE PRESENT INVENTION

Figure 1:
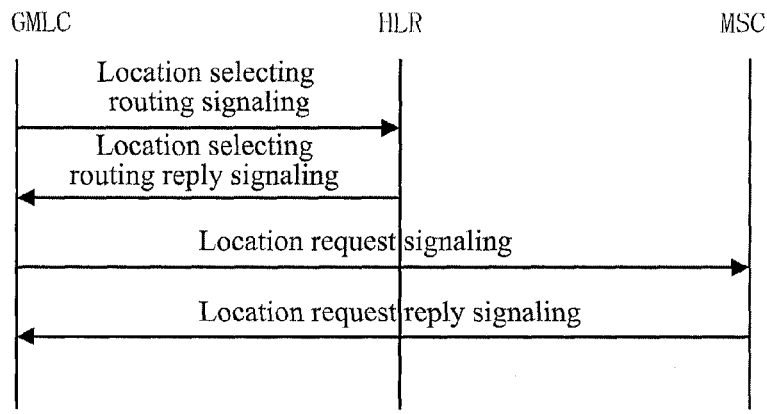
FIG. 1 is a flow chart of a location method for obtaining the location of a terminal in the prior art.
Figure 2:
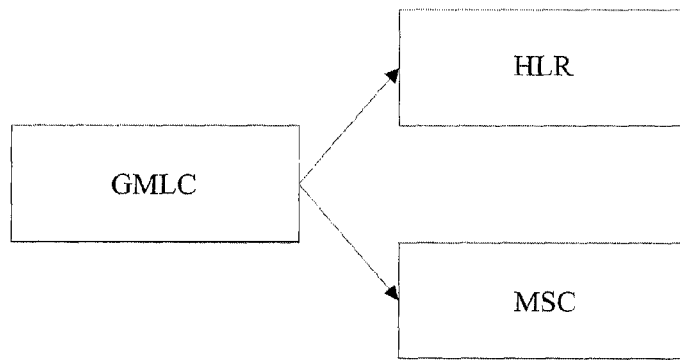
FIG. 2 is a block diagram of a location system for obtaining the location of a terminal in accordance with an embodiment.

As shown in FIG. 2, a location system for obtaining the location of a terminal comprises a gateway mobile location center (GMLC for short), a home location register (HLR for short) and a mobile switching center (MSC for short).

The GMLC is composed of a front-end GMLC MAP (Mobile Application) module and a location client. The front-end GMLC MAP module implements transmission of location related signaling (such as location selecting routing signaling), and the location client is responsible for calculating location information and triggering the location signaling. The two components are collectively called as the GMLC.

The GMLC is configured to, when being unable to obtain the address of the MSC to which the terminal belongs from the HLR by sending the location selecting routing (MAP-SRI-FOR-LCS), send short message type information to the HLR, and send location request signaling (MAP-PSL-FOR-LCS) to the MSC after obtaining the address of the MSC to which the terminal belongs from the HLR, calculate location information of the terminal based on location parameters of the terminal obtained from the MSC. The HLR is configured to update the location of the terminal after receiving the short message type information sent by the GMLC, and notify the GMLC of the updated address of the MSC to which the terminal belongs.

Both a short message selecting routing message and a short message termination call request are short message type information.

In this system, when the HLR does not support the location selecting routing function, the location of the terminal is obtained in the following way.

After the GMLC sends the location selecting routing signaling, if it learns that the HLR does not support the location selecting routing function from error cause information returned by the HLR, the GMLC sends a short message selecting routing message (MAP-SRI-FOR-SM) to the HLR, and obtains the address of the MSC to which the terminal belongs from the received short message selecting routing reply message. After the HLR receives the short message selecting routing message (MAP-SRI-FOR-SM) sent by the GMLC, it updates the location of the terminal, and sends the updated address of the MSC to which the terminal belongs to the GMLC through the short message selecting routing reply message.

In this system, when the HLR does not support the current mobile application part (MAP for short) protocol version, the location of the terminal can be obtained by the following way.

After the GMLC sends the location selection routing signaling, if it learns that the HLR does not support the current MAP protocol version from the error cause information returned by the HLR, it sends a short message selecting routing message, the MAP protocol version of which is lower than the current MAP protocol version, obtains the address of the MSC to which the terminal belongs from the received short message selecting routing reply message. After the HLR receives the short message selecting routing message sent by the GMLC, it determines that the MAP protocol version of the short message selecting routing message is supported by the HLR, updates the location of the terminal, and sends the updated address of the MSC to which the terminal belongs to the GMLC through the short message selecting routing reply message.

Mobile application part protocols in terms of levels of versions from low to high include: mobile application part phase1 protocol, mobile application part Phase2 protocol, and mobile application part phase2+ protocol.

After the GMLC sends the short message selecting routing message using the MAP phase2+ protocol, when it learns that the HLR does not support the MAP phase2+ protocol, the GMLC can send the short message selecting routing message of the MAP phase2 protocol. If the HLR supports the MAP phase2 protocol, the GMLC can obtain the short message selecting routing reply message carrying the address of the MSC to which the terminal belongs; if the HLR does not support the MAP phase2 protocol, the HLR sends the short message selecting routing reply message of the MAP phase1 protocol. The GMLC might also send the short message selecting routing message of the MAP phase1 protocol directly after learning that the HLR does not support the MAP phase2+ protocol.

In this system, since the MSC does not update the location of the user terminal for some reasons, when location parameters of the terminal in the location request reply message returned after the location request signaling is received are empty, the location of the terminal can be obtained by the following way.

When the GMLC receives the location request reply message not carrying the location parameters of the terminal after sending the location request signaling to the MSC, it sends a short message termination call request to the MSC. After the MSC receives the short message termination call request, it updates the location of the terminal and returns a termination call response message carrying the location parameters of the terminal.

Figure 3:
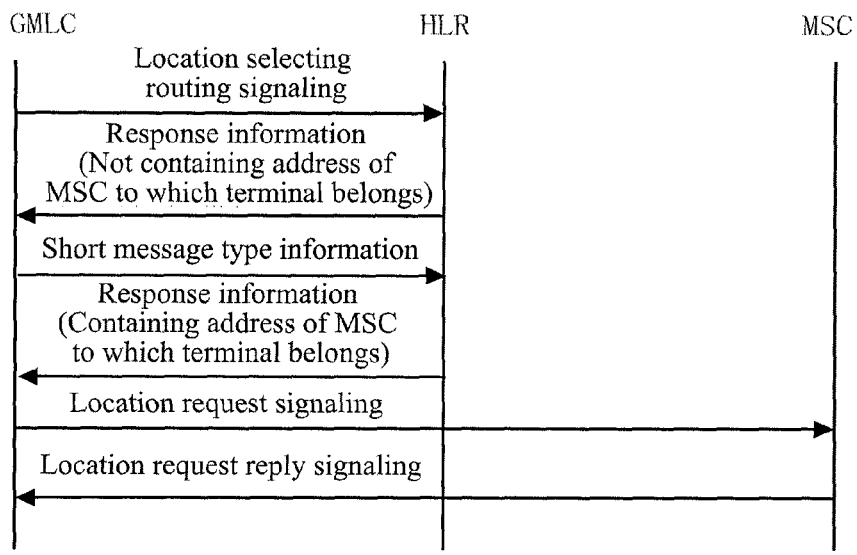
FIG. 3 is a flow chart of a location method for obtaining the location of a terminal in accordance with an embodiment.

As shown in FIG. 3, a location method for obtaining the location of a terminal comprises, when a gateway mobile location center is unable to obtain the address of a mobile switching center to which the terminal belongs from a home location register in a core network by sending location selection routing signaling, after sending short message type information to trigger the home location register to update the location of the terminal and obtaining the address of the mobile switching center to which the terminal belongs, the gateway mobile location center obtaining location parameters of the terminal by sending location request signaling, and calculating location information of the terminal.

The First Embodiment

Figure 4:
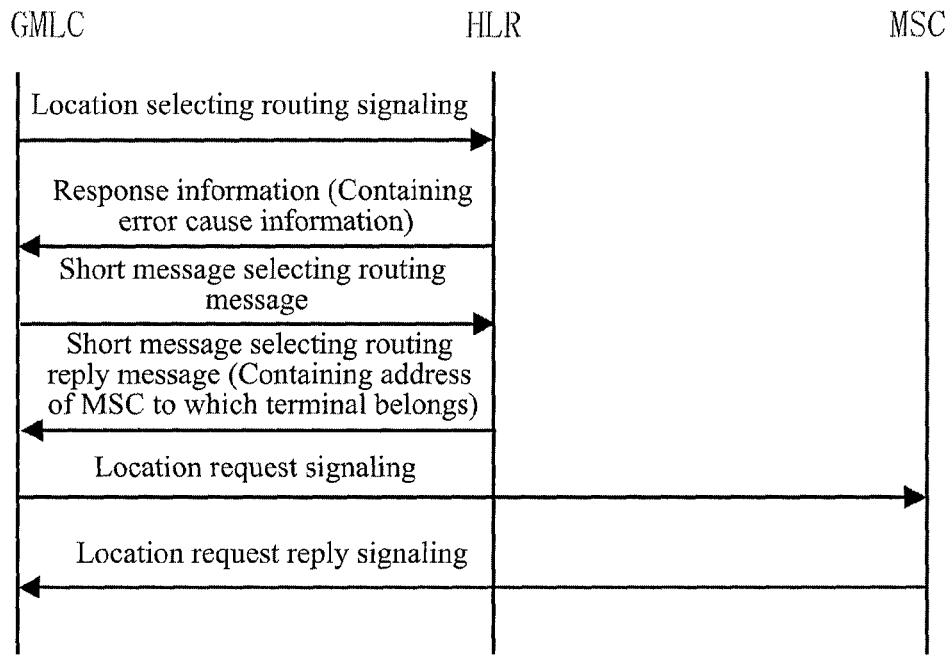
FIG. 4 is a flow chart of a location method for obtaining the location of a terminal in accordance with the first embodiment.

As shown in FIG. 4, in the first embodiment, when a HLR does not support the location selecting routing function, the location of a terminal can be obtained by the following way.

When a GMLC learns that the HLR does not support the location selecting routing function from error cause information returned by the HLR after sending location selecting routing signaling, it sends a short message selecting routing message to the HLR. After the HLR receives the short message selecting routing message, it updates the location of the terminal and returns a short message selecting routing reply message carrying the address of the MSC to which the terminal belongs. The GMLC sends location request signaling to obtain location parameters of the terminal and calculates location information of the terminal.

The Second Embodiment

Figure 5:
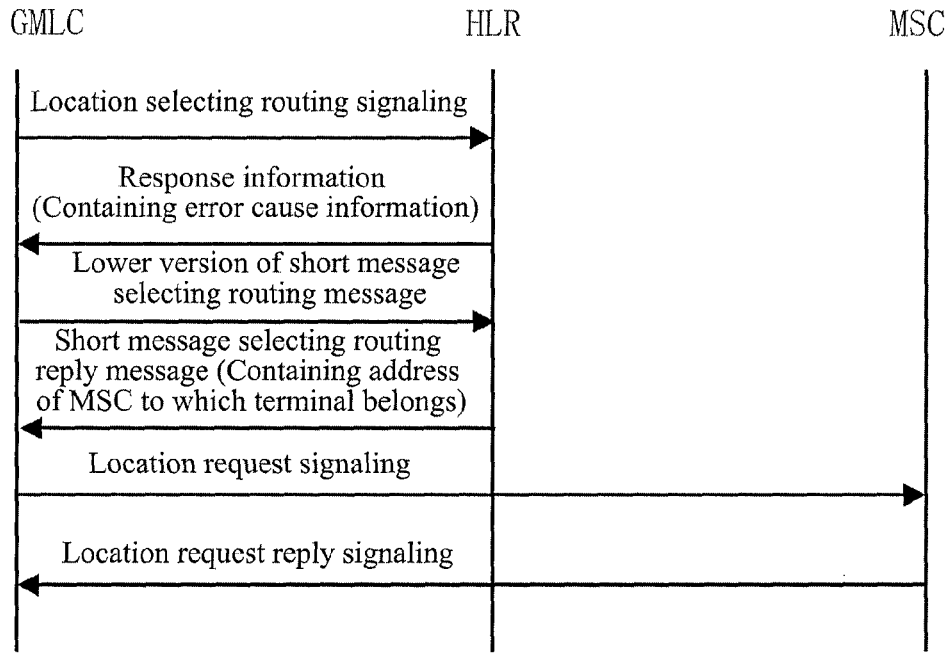
FIG. 5 is a flow chart of a location method for obtaining the location of a terminal in accordance with a second embodiment.

As shown in FIG. 5, in the second embodiment, when a HLR does not support the current MAP protocol version, the location of a terminal is obtained by the following way.

When a GMLC learns that the HLR does not support the current mobile application part protocol version from error cause information returned by the HLR after sending location selecting routing signaling, it sends a short message selecting routing message, the mobile application part protocol version of which is lower than the current mobile application part protocol version. After the HLR receives the short message selecting routing message, it determines that the mobile application part protocol version of the short message selecting routing message is supported by the home location register, updates the location of the terminal and returns a short message selecting routing reply message carrying the address of the MSC to which the terminal belongs.

Mobile application part protocols in terms of levels of versions from low to high include: mobile application part phase1 protocol, mobile application part Phase2 protocol, and mobile application part phase2+ protocol.

When the GMLC learns that the HLR does not support the MAP phase2+ protocol after sending the short message selecting routing message using the MAP phase2+ protocol, it can send a short message selecting routing message of the MAP phase2 protocol. If the HLR supports the MAP phase2 protocol, the GMLC can obtain the short message selecting routing message reply message containing the address of the MSC to which the terminal belongs; if the HLR does not support the MAP phase2 protocol, the HLR sends the short message selecting routing message of the MAP phase1 protocol. The GMLC can also send the short message selecting routing message of the MAP phase1 protocol directly when learning that the HLR does not support the MAP phase2+ protocol.

The Third Embodiment

In the third embodiment, since the MSC does not update the location of the user terminal for some reasons, when location parameters of the terminal in the location request reply message returned after the location request signaling is received are empty, the location of the terminal can be obtained by the following way.

When the HLR supports the location selecting routing function and supports the current MAP protocol version, the GMLC sends location selecting routing signaling to the HLR according to the process in the prior art, and obtains the address of the MSC to which the terminal belongs from the returned location selecting routing reply message. When the HLR does not support the location selecting routing function or the current MAP protocol version, the GMLC obtains the address of the MSC to which the terminal belongs according to the ways described in the first or second embodiment.

After the GMLC obtains the address of the MSC to which the terminal belongs, it sends location request signaling, and sends a short message termination call request to the MSC when receiving a location request reply message not carrying location parameters of the terminal. After the MSC receives the short message termination call request, it updates the location of the terminal and returns a termination call response message carrying the location parameters of the terminal.

In the present invention, in typical scenarios where the HLR does not support the location selecting routing function, the HLR does not support the current MAP protocol version and the MSC does not update the location of the user terminal, the GMLC obtains the related location information by sending the short message type information in the wireless communication protocol, so as to ensure successful locating of the terminal.

Other various embodiments of the present invention may also be possible. Various modifications and variations to the present invention may be made by those skilled in the art without departing from the spirit and essence of the present invention. However, these corresponding modifications and variations should be covered in the protection scope of the appended claims of the present invention.

It may be understood by those skilled in the art that all or some of the steps in the described method can be implemented by related hardware instructed by programs which may be stored in computer readable storage mediums, such as read-only memory, disk or CD-ROM, etc. Alternatively, all or some of the steps in the embodiments described above may also be implemented using one or more integrated circuits. Accordingly, each module/unit in the embodiments described above may be implemented in a form of hardware, or software functional module. The present invention is not limited to combinations of hardware and software in any particular form.

INDUSTRIAL APPLICABILITY

Compared with the prior art, in typical scenarios where the HLR does not support the location selecting routing function, the HLR does not support the current MAP protocol version and the MSC does not update the location of the user terminal, the present invention ensures smooth implementation of the location function of the terminal without any special network modification, thereby resulting in greatly decreased cost and flexible application.

What is claimed is:

1. A location method for obtaining a location of a terminal comprising:
   when a gateway mobile location center is unable to obtain an address of a mobile switching center to which the terminal belongs from a home location register in a core network by sending a location selecting routing signaling (MAP SRI FOR LCS), the gateway mobile location center sending a short message to trigger the home location register to update the location of the terminal and obtaining the address of the mobile switching center to which the terminal belongs, the gateway mobile location center obtaining location parameters of the terminal by sending a location request signaling to the mobile switching center to which the terminal belongs, and calculating location information of the terminal;
   wherein the gateway mobile location center being unable to obtain the address of the mobile switching center to which the terminal belongs from the home location register in the core network by sending the location selectin routing signaling means that:
   the gateway mobile location center learns that the home location register does not support a location selectin routing function from error cause information returned by the home location register after sending the location selecting routing signaling;
   the step of sending the short message to trigger the home location register to update the location of the terminal and obtaining the address of the mobile switching center to which the terminal belongs comprises:
   the gateway mobile location center sending a short message selecting routing message to the home location register, and the home location register updating the location of the terminal after receiving the selecting routing message and returning a short message selecting routing reply message carrying the address of the mobile switching center to which the terminal belongs; or,
   the gateway mobile location center being unable to obtain the address of the mobile switching center to which the terminal belongs from the home location register in the core network by sending the location selecting routing signaling means that:
   the gateway mobile location center learns that the home location register does not support current mobile application part protocol version from the error cause information returned by the home location register after sending the location selecting raining signaling;
   the step of sending the short message to trigger the home location register to update the location of the terminal and obtaining the address of the mobile switching center to which the terminal belongs comprises:
   the gateway mobile location center sending the home location register a short message selecting routing message, the mobile application part protocol version of which is lower than current mobile application part protocol version, and the home location register determining that the mobile application part protocol version of the selecting routing message is supported by the home location register after receiving the selecting routing message, updating the location of the terminal and returning a short message selecting routing reply message carrying the address of the mobile switching center to which the terminal belongs.

2. The method according to claim 1, further comprising:
   when the gateway mobile location center receiving a location request reply message not carrying the location parameters of the terminal after sending the location request signaling, the gateway mobile location center sending a short message termination call request to the mobile switching center to which the terminal belongs, and the mobile switching center to which the terminal belongs updating the location of the terminal after receiving the termination call request and returning a termination call response message carrying the location parameters of the terminal.

3. The method according to claim 1, wherein
   mobile application part protocols in terms of levels of versions from low to high include: mobile application part protocol version 1, mobile application part protocol version 2, and mobile application part protocol version 2+.

4. The method according to claim 3, further comprising:
   when the gateway mobile location center receiving a location request reply message not carrying the location parameters of the terminal after sending the location request signaling, the gateway mobile location center sending a short message termination call request to the mobile switching center to which the terminal belongs, and the mobile switching center to which the terminal belongs updating the location of the terminal after receiving the termination call request and returning a termination call response message carrying the location parameters of the terminal.

5. A location system for obtaining a location of a terminal comprising a gateway mobile location center, a home location register and a mobile switching center; wherein the gateway mobile location center is configured to, when being unable to obtain an address of the mobile switching center to which the terminal belongs from the home location register in a core network by sending a location selecting routing signaling (MAP SRI FOR LCS), send a short message to trigger the home location register to update the location of the terminal and obtain the address of the mobile switching center to which the terminal belongs from the home location register, and send a location request signaling to the mobile switching center to which the terminal belongs to calculate location information of the terminal based on location parameters of the terminal, which are obtained from the mobile switching center to which the terminal belongs; and the home location register is configured to update the location of the terminal after receiving the short message sent by the gateway mobile location center, and notify the gateway mobile location center of the updated address of the mobile switching center to which the terminal belongs;

wherein the gateway mobile location center is configure to, when learning that the home location register does not support a location selecting routing function from error cause information returned by the home location register after sending the location selecting routing signaling, send a short message selecting routing message to the home location register, and obtain the address of the mobile switching center to which the terminal belongs from a short message selecting routing reply message returned by the home location register; and the home location register is configured to, update the location of the terminal after receiving the selecting routing message sent by the gateway mobile location center, and send the updated address of the mobile switching center to which the terminal belongs through the selecting routing reply message to the gateway mobile location center;

or, the gateway mobile location center is configured to, when learning that the home location register does not support current mobile application part protocol version from the error cause information returned by the home location register after sending the location selecting routing signaling, send a short message selecting routing message, the mobile application part protocol version of which is lower than the current mobile application part protocol version, and obtain the address of the mobile switching center to which the terminal belongs from a short message selecting routing rely message returned by the home location register; and the home location register is configured to, when determining that the mobile application part protocol version of the received selecting routing message is supported by the home location register after receiving the selecting routing message sent by the gateway mobile location center, update the location of the terminal, and send the upgraded address of the mobile switching center to which the terminal belongs to the gateway mobile location center through the selecting routing reply message.

6. The location system according to claim 5, wherein the gateway mobile location center is further configured to, when receiving a location request reply message not carrying location parameters of the terminal after sending the location request signaling to which the terminal belongs, send a short message termination call request to the mobile switching center to which the terminal belongs; and the mobile switching center is configured to, as the mobile switching center to which the terminal belongs, update the location of the terminal after receiving the termination call request and return a termination call response message carrying the location parameters of the terminal.

7. The location system according to claim 5, wherein mobile application part protocols in terms of levels of versions from low to high include: mobile application part protocol version 1, mobile application part protocol version 2, and mobile application part protocol version 2+.

8. The location system according to claim 7, wherein the gateway mobile location center is further configured to, when receiving a location request reply message not carrying location parameters of the terminal after sending the location request signaling to which the terminal belongs, send a short message termination call request in to the mobile switching center to which the terminal belongs; and the mobile switching center is configured to, as the mobile switching center to which the terminal belongs, update the location of the terminal after receiving the termination call request and return a termination call response message carrying the location parameters of the terminal.

* * * * *